United States Patent [19]

La Pierre et al.

[11] 4,377,468
[45] Mar. 22, 1983

[54] SULFUR- AND NITROGEN-CONTAINING HYDROCARBON FEED HYDROCRACKING OVER ZSM-20

[75] Inventors: Rene B. La Pierre, Morrisville; Robert L. Gorring, Washington Crossing, both of Pa.

[73] Assignee: Mobil Oil Corporation, New York, N.Y.

[21] Appl. No.: 303,334

[22] Filed: Sep. 18, 1981

Related U.S. Application Data

[63] Continuation of Ser. No. 5,066, Jan. 22, 1979, abandoned.

[51] Int. Cl.$^3$ .................................................. C10G 47/18
[52] U.S. Cl. .................................... 208/111; 208/15; 252/455 Z; 252/460
[58] Field of Search ............................. 208/120, 111

[56] References Cited

U.S. PATENT DOCUMENTS

| | | | |
|---|---|---|---|
| 3,269,934 | 8/1966 | Hansford | 208/111 |
| 3,442,795 | 5/1969 | Kerr et al. | 208/120 |
| 3,502,572 | 3/1970 | Watkins et al. | 208/111 |
| 3,505,208 | 4/1970 | Vaell | 208/111 |
| 3,523,887 | 8/1970 | Hanson et al. | 208/111 |
| 3,524,809 | 8/1970 | Hansford | 208/111 |
| 3,972,983 | 8/1976 | Ciric | 423/328 |
| 4,021,331 | 5/1977 | Ciric | 208/111 |

*Primary Examiner*—Delbert E. Gantz
*Assistant Examiner*—G. E. Schmitkons
*Attorney, Agent, or Firm*—Charles A. Huggett; Michael G. Gilman; Charles J. Speciale

[57] ABSTRACT

A catalyst effective in hydrotreating and hydrocracking sulfur- and nitrogen-containing hydrocarbon feeds at low pressure. The catalyst is prepared by incorporating a platinum group metal such as palladium in ZSM-20 or in dealuminized zeolite Y. Unlike most palladium catalyst, this catalyst is not poisoned by nitrogen and sulfur in the feed.

9 Claims, No Drawings

SULFUR- AND NITROGEN-CONTAINING HYDROCARBON FEED HYDROCRACKING OVER ZSM-20

This is a continuation of copending application Ser. No. 005,066, filed Jan. 22, 1979, now abandoned.

BACKGROUND OF THE INVENTION

1. Field of the Invention

This invention relates to catalytic conversion of hydrocarbon feeds containing sulfur and nitrogen containing organic compounds.

2. Description of the Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of channels. These cavities and channels are uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,832,449), zeolite ZSM-12 (U.S. Pat. No. 3,832,449), and zeolite ZSM-20 (U.S. Pat. No. 3,972,983 and U.S. Pat. No. 4,021,331 merely to name a few.

A crystalline aluminosilicate zeolite well known in the art is faujasite. The ZSM-20 zeolite for use in the present invention resembles faujasite in certain aspects of structure, but has a notably higher silica/alumina ratio than faujasite, as does of course, the dealuminized zeolite Y.

SUMMARY OF THE INVENTION

The present invention relates to the use of a hydrogenation function containing synthetic crystalline zeolite ZSM-20 or dealuminized zeolite Y, or the thermally treated products thereof for sulfur- and nitrogen-containing organic compound, e.g. hydrocarbon compound, conversion. The ZSM-20 and zeolite Y compositions have already been identified, while dealuminzed zeolite Y may be prepared by the method found in U.S. Pat. No. 3,442,795. The catalysts may be prepared by incorporating a Group VIII metal or mixtures thereof, preferably a platinum group metal (e.g. Pd) in an amount between about 0.1 and 10.0 wt. % into ZSM-20 or the dealuminized Y.

When a hydrogenation component such as palladium is incorporated into the crystalline molecular sieve zeolites ZSM-20 or dealuminized Y (both $SiO_2/Al_2O_3 > 6$), a catalyst is produced which has the ability to (1) hydrogenate aromatic hydrocarbons at low pressure in the presence of sulfur and nitrogen poisons
(2) convert sulfur and nitrogen containing poisons to $H_2S$ and $NH_3$ and saturated hydrocarbons
(3) hydrocrack hydrocarbon mixtures containing sulfur and nitrogen poisons to lower molecular weight mixtures while substantially improving the quality of the material remaining in the original boiling range of the hydrocarbon mixture.

It is known that palladium and other Group VIII metals deposited on amorphous supports are unable to hydrogenate aromatic hydrocarbons at low pressure in the presence of sulfur and nitrogen poisons. In addition it is known (A. V. Agafonov et al, Khimiya i Tekhnologiya Topliv i Masel, No. 6 pp. 12–14, June, 1976) that Pd deposited on NaX, NaY, Na mordenite, KNaL, and KNa Erionite are also essentially inactive for the above mentioned conversion. We have also shown that the same applies to Pd/HZSM-12 and Rh H B. The only Pd zeolite known to us to possess high activity for the above mentioned conversion are Pd Dealuminized Y (s. Agafonov et al, above) and the Pd/ZSM-20 catalyst we have prepared.

Both Dealuminized Y and ZSM-20 are, as mentioned above, materials described in U.S. Pat. Nos. 3,442,795 and 3,972,983, respectively. In addition, such catalysts are active and stable in hydrocracking at pressures of 500–1500 psi and 500°–700° F., whereas it is not uncommon for such hydrocracking processes to operate at 2000–3000 psi and 650°–800° F.

The original cations of the as synthesized ZSM-20 for use herein can be replaced in accordance with techniques well known in the art, at least in part, by ion exchange with other cations. Preferred replacing cations include metal ions, ammonium ions, hydrogen ions and mixtures thereof. Particularly preferred cations are those which render the zeolite catalytically-active, especially for hydrocarbon conversion. These include hydrogen, hydrogen precursors (e.g. ammonium ions), rare earth metals, aluminum, metals of Groups IB, IIB, IIIB, IVB, VIB, IIA, IIIA, IVA and VIII of the Periodic Table of Elements.

The zeolites for use herein may be formed in a wide variety of particle sizes. Generally speaking, the particles can be in the form of a powder, a granule, or a molded product, such as extrudate having a particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

As in the case of many catalysts, it may be desired to incorporate the zeolite with another material resistant to the temperatures and other conditions employed in organic compound conversion processes. Such matrix materials include active and inactive materials and synthetic or naturally occurring zeolites as well as inorganic materials such as clays, silica and/or metal oxides, such as alumina. The latter may be either naturally occurring or in the form of gelatinous precipitates, sols or gels including mixtures of silica and metal oxides. Use of a material in conjunction with the zeolite, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g. bentonite and kaolin. These materials, i.e, clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the synthetic zeolite catalysts include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline zeolite, e.g. ZSM-20, and inorganic oxide gel matrix vary widely with the crystalline aluminosilicate content ranging from about 1 to about 90 percent by weight and more usually in the range of about 2 to about 70 percent by weight of the composite.

In general, organic compounds may be catalytically converted in the presence of the present zeolite catalyst material, including the product of thermal treatment thereof, over a range of catalytic conversion conditions, including a reaction temperature of from about 100° F. to about 1200° F., preferably from about 400° F. to about 1000° F., a reaction pressure of from atmospheric to about 10,000 psig, preferably from about atmospheric to about 3,500 psig, and a hydrogen/organic compound ratio of from 0 to about 20,000 scf/bbl, preferably from 0 to about 10,000 scf/bbl. When the conversion is conducted in a flow apparatus, e.g. a down-flow reactor, or under conditions comparable to those existing in a flow apparatus, the liquid hourly space velocity (LHSV) should be maintained at between about 0.1 $hr^{-1}$ and about 10 $hr^{-1}$. When the conversion is conducted in a batch apparatus, e.g. a stirred batch reactor, or under conditions comparable to those existing in a batch apparatus, the contact time should be maintained at between about 0.01 hour and about 48 hours, preferably between about 0.1 hour and about 24 hours.

In particular, when the conversion of organic compound by the present method is olefin polymerization, catalyst conversion conditions should be maintained within certain critical ranges, including a temperature of from about 100° F. to about 800° F., preferably from about 400° F. to about 600° F., a pressure of from about atmospheric to about 4,000 psig, preferably from about atmospheric to about 2,000 psig, a LHSV (when a flow operation) of from about 0.1 $hr^{-1}$ to about 50 $hr^{-1}$, preferably from about 1 $hr^{-1}$ to about 10 $hr^{-1}$, and a contact time (when a batch operation) of from about 0.1 hour to about 48 hours, preferably from about 0.5 hour to about 24 hours and a hydrogen/hydrocarbon (i.e. olefin) ratio of from about 50 scf/bbl to about 10,000 scf/bbl, preferably from about 500 scf/bbl to about 5,000 scf/bbl.

When the conversion is olefin or paraffin aromatization, catalyst conversion conditions should be maintained within critical ranges, including a temperature of from about 600° F. to about 1200° F., preferably from about 800° F. to about 1000° F., a pressure of from about 50 psig to about 10,000 psig, preferably from about 100 psig to about 1,000 psig, a LHSV (when a flow operation) of from about 0.1 $hr^{-1}$ to about 10 $hr^{-1}$, preferably from about 1 $hr^{-1}$ to about 5 $hr^{-1}$, a contact time (when a batch operation) of from about 0.1 hour to about 48 hours, preferably from about 1 hour to about 24 hours and a hydrogen/hydrocarbon (i.e. olefin or paraffin) ratio of from about 50 scf/bbl to about 10,000 scf/bbl, preferably from about 100 scf/bbl to about 1,000 scf/bbl.

Further, when the conversion of organic compound by the present method is cracking, catalytic conversion conditions should be maintained within certain critical ranges, including a temperature of from about 700° F. to about 1200° F., preferably from about 800° F. to about 1000° F., a pressure of from about atmospheric to about 200 psig, a LHSV (when a flow operation) of from about 0.5 $hr^{-1}$ to about 50 $hr^{-1}$, preferably from about 1 $hr^{-1}$ to about 10 $hr^{-1}$, and a contact time (when a batch operation) of from about 0.01 hour to about 24 hours, preferably from about 0.1 hour to about 10 hours. When the conversion is hydrocracking, catalyst conversion conditions should be maintained within somewhat different ranges, including a temperature of from about 400° F. to about 1000° F., preferably from about 500° F. to about 850° F., a pressure of from about 500 psig to about 3500 psig, a LHSV (when a flow operation) of from about 0.1 $hr^{-1}$ to about 10 $hr^{-1}$, preferably from about 0.2 $hr^{-1}$ to about 5 $hr^{-1}$, a contact time (when a batch operation) of from about 0.1 hour to about 10 hours, preferably from about 0.2 hour to about 5 hours and a hydrogen/hydrocarbon ratio of from about 1000 scf/bbl to about 20,000 scf/bbl, preferably from about 3,000 scf/bbl to about 10,000 scf/bbl.

In order to more fully illustrate the nature of the invention and the manner of practicing same, the following non-limiting examples are presented.

The ZSM-20 starting material was made in accord with the procedure set out in Example 1 below, while the Pd/Mg/ZSM-20 and Pd/Mg/Dealuminized Y were made in accord with procedures set forth in Examples 2 and 3 below.

EXAMPLE 1

A mixture of
193.7 gm Tetraethylorthosilicate
7.9 gm Sodium Aluminate
291 ml 2.8 N Tetraethylammonium hydroxide
and
72 gm Water
which gives the following mole ratios
$SiO_2/Al_2O_3 = 30$
$H_2O/SiO_2 = 15$
$OH/SiO_2 = 0.90$
$Na/SiO_2 = 0.09$
and
$TEA/SiO_2 = 0.88$
was aged for 3 days at 25° C. in a 300 ml polypropylene bottle and then crystallized for an additional 18 days at 100° C. under static conditions to give crystalline ZSM-20 in 90% purity with a $SiO_2/Al_2O_3$ mole ratio of 8.66.

EXAMPLE 2

5% Pd/Mg/ZSM-20

The TEA, Na ZSM-20 was exchanged with 1 molar $MgCl_2$ at reflux overnight, washed until free of $Cl^-$, and air dried at 120° C. The magnesium exchanged ZSM-20 was then reslurried in distilled $H_2O$, an aqueous solution of $Pd(NH_4)_4Cl_2$ was added dropwise, stirred overnight at 40° C., washed free of $Cl^-$, air dried at 140° C., and then air calcined at 500° C. for four hours. Elemental analysis of the calcined catalyst showed that Pd exchange was quantitative.

A product was obtained having the oxide composition:

| 5% Pd/Mg/ZSM-20 | | | |
|---|---|---|---|
| | wt % | meq/gm | |
| PdO | 6.2 | 1.0 | |
| MgO | 3.3 | 1.6 | 3.24 |
| $Na_2O$ | 1.98 | 0.64 | |
| $SiO_2$ | 74.00 | | |
| $Al_2O_3$ | 14.50 | 2.84 | |
| | $SiO_2/Al_2O_3 = 8.66$ | | |

EXAMPLE 3

5% Pd/Mg/Dealuminized Y 500.3 gm (2068 meq Al) of Na Y ($SiO_2/Al_2O_3 = 4.9$) was slurried in 1300 ml deionized $H_2O$. 233.07 gm (692 meq) $Na_2$ EDTA was added and the slurry heated to reflux while stirring. 262 ml 5 N HCl (1310 meq $H^+$) was added to the refluxing stirred slurry at a rate of 3.4 ml/hr so as to remove 31.7% of the framework aluminum and give a $SiO_2/Al_2O_3$ ratio of 7.1. Elemental analysis of the dealuminized material gave a $SiO_2/Al_2O_3$ ratio of 6.8 and Na/Al ratio of 0.96 indicating the presence of some non-framework aluminum. The dealuminized sample was found to be 86% crystalline when compared to the original Na Y starting material.

50 gm of the dealuminized Na Y was exchanged 3 times (4, 22, 4 hours) with 300 ml 1 N $MgCl_2$ at reflux, given an intermediate calcination at 500° C. and given one additional exchange treatment for 4 hours using the same procedure. Elemental analysis showed that 73% of the Na had been exchanged by Mg.

15 gm of the Mg exchanged-dealuminized Y was then slurried in 100 ml deionized $H_2O$ and a 50 ml aqueous solution containing 0.75 gm Pd as $Pd(NH_3)_4^{++}$ was added dropwise and stirred for 20 hours §60° C.

The Pd exchanged material was washed until free of $Cl^-$, dried at 120° C. and calcined at 500° C. for 4 hours. The calcined catalyst contained 5.2% Pd, was tan in color, and showed no evidence of metallic Pd by X-ray.

A product was obtained having the oxide composition:

| 5% Pd/Mg/Dealuminized Y | | |
|---|---|---|
| wt % | meq*/gm | |
| 5.9 | 0.98 | |
| 3.25 | 1.62 | 3.52 |
| 2.84 | 0.92 | |
| 71.1 | | |
| 16.9 | 3.34 | |
| | $SiO_2/Al_2O_3 = 7.15$ | |

*Milliequivalents of ionic species per gram of dehydrated catalyst.

EXAMPLES 4-6

Tetralin containing 700 ppm S as benzothiophene was converted over the above catalysts and Ht-500E, a commercially available hydrotreating catalyst which was used as a control in this work. The results obtained are summarized below.

| Catalyst | Example 4 Pd/Mg/ZSM-20 | Example 5 Pd/Mg/DalY | Example 6 HT500E NiMo/$Al_2O_3$ |
|---|---|---|---|
| T °F. | 460 | 480 | 500 | 600 |
| LHSV | 1.0 | 1.0 | 1.0 | 1.0 |
| Pressure PSIA | 500 | 500 | 500 | 500 |
| Tetralin Conv. | 94 | 100 | 100 | 11 |
| Decalin Select. | 80 | 55 | 79 | 70 |
| $C_{10}$ Selectivity | >95 | >95 | >95 | 100 |

From the above data it is obvious that the ZSM-20 based catalyst is more active than the catalyst based on dealuminized Y (the best known catalyst of prior art) and is much more active than the commercial NiMo-/$Al_2O_3$ catalyst.

EXAMPLES 7-9

Identical experiments were performed except that 500 ppm N as quinoline was added to the sulfur-containing feed with the following results:

| Catalyst | Example 7 Pd/Mg/ZSM-20 | Example 8 Pd/Mg/DalY | Example 9 Ht-500 NiMo/$Al_2O_3$ |
|---|---|---|---|
| T °F. | 625 | 625 | 630 |
| LHSV | 1 | 1 | 1 |
| Pressure | 750* | 500 | 500 |
| Tetralin Conv. | 75 | 30 | 13 |
| Decalin Select. | 68 | 86 | 61 |
| $C_{10}$ Selectivity | 99 | >95 | 100 |

Again the ZSM-20 catalyst was the most active.
*Increasing pressure from 500 to 750 psi has a significant activating effect.

EXAMPLES 10-12

As further examples, a 475°-725° F. Arab Light gas oil containing 1.09% S, 60 ppm N and 13.32% H, was reacted over the three catalysts at 1.0 LHSV, 750 psi, and 6000 scf/bbl $H_2$ with the following results:

| Catalyst | Example 10 Pd/Mg/ZSM-20 | Example 11 Pd/Mg/DalY | Example 12 Ht-500 NiMo/$Al_2O_3$ |
|---|---|---|---|
| Time on Stream (Hrs.) | 450 | 210 | 215 |
| T °F. | 600 | 635 | 648 |
| 420+ Conversion | 29.7 | 31.7 | <1 |
| % H in $C_5^+$ Prod. | 14.39 / 14.23 | 14.31 / 14.30 | 13.85 |
| % S in $C_5^+$ Prod. | .002 | .12 | .07 |

In this case the zeolite catalysts were able to produce products containing much more hydrogen than those produced over the NiMo/$Al_2O_3$ catalyst. Again, the ZSM-20 based catalyst being more active than that based on dealuminized Y.

In summary, from all of the foregoing, it has been found that the hydrogenation activity and selectivity of the Pd/ZSM-20 catalyst at low pressure in the presence of sulfur and nitrogen is not an expected, general characteristic Pd/zeolite type catalyst.

What is claimed is:

1. A process for effecting catalytic hydrocracking at low pressure of a hydrocarbon charge containing sulfur- and nitrogen-containing organic compounds which comprises contacting a mixture of said charge and hydrogen with a catalyst comprising a Group VIII metal-containing synthetic crystalline zeolite ZSM-20 said Group VIII metal being present in an amount between about 0.1 and 10.0%.

2. The process of claim 1 wherein said catalyst is Pd/Mg/ZSM-20.

3. The process of claim 1 wherein said Group VIII metal is palladium.

4. The process of claim 1 wherein said zeolite as synthesized has undergone at least partial cation replacement by ion exchange with a cation or a mixture of cations selected from the group consisting of hydrogen, hydrogen precursors, rare earth metals, and metals from Groups IIA, IIIA, IVA, IB, IIB, IIIB, IVB, VIB, AND VIII of the Periodic Table of Elements.

5. The process of claim 4 wherein the replaced cation is sodium.

6. The process of claim 4 wherein said zeolite as synthesized has undergone at least partial cation replacement by ion exchange with hydrogen or hydrogen precursor cations.

7. The process of claim 4 wherein said zeolite as synthesized has undergone at least partial cation replacement by ion exchange with rare earth metal cations.

8. The process of claim 1 wherein the hydrocracking conditions include a temperature of from about 400° F. to about 1000° F., a pressure of from about 500 psig to about 3500 psig, a hydrogen/hydrocarbon ratio of from about 1000 scf/bbl to about 20,000 scf/bbl and a liquid hourly space velocity of from about 0.1 $hr^{-1}$ to about 10 $hr^{-1}$.

9. The process of claim 1 wherein the hydrocracking conditions include a temperature of from about 400° F. to about 1000° F., a pressure of from about 500 psig to about 3500 psig, a hydrogen/hydrocarbon ratio of from about 1000 scf/bbl to about 20,000 scf/bbl and a contact time of from about 0.1 hour to about 10 hours.

* * * * *